United States Patent
Ban et al.

(10) Patent No.: US 9,664,586 B2
(45) Date of Patent: May 30, 2017

(54) SYSTEM AND METHOD FOR COMPENSATING OFFSET OF PRESSURE SENSOR

(71) Applicant: Hyundai Motor Company, Seoul (KR)

(72) Inventors: Hyeon Seok Ban, Gyeonggi-do (KR); Ho June Bae, Seoul (KR); Hyun Joon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 14/563,043

(22) Filed: Dec. 8, 2014

(65) Prior Publication Data
US 2016/0033351 A1 Feb. 4, 2016

(30) Foreign Application Priority Data
Aug. 4, 2014 (KR) .................. 10-2014-0099798

(51) Int. Cl.
*G01L 27/00* (2006.01)

(52) U.S. Cl.
CPC .................. *G01L 27/005* (2013.01)

(58) Field of Classification Search
CPC ........ G01L 27/00; G01L 27/005; F02D 41/22
See application file for complete search history.

(56) References Cited

U.S. PATENT DOCUMENTS

| | | | | |
|---|---|---|---|---|
| 5,560,199 | A * | 10/1996 | Agustin | F01N 3/22 60/274 |
| 6,539,921 | B1 * | 4/2003 | Matsumura | F02D 41/2474 123/456 |
| 6,705,296 | B2 | 3/2004 | Horstmann et al. | |
| 2003/0213294 | A1 * | 11/2003 | Date | F02D 41/222 73/114.45 |
| 2007/0151321 | A1 | 7/2007 | Ohmi et al. | |
| 2008/0209990 | A1 * | 9/2008 | Hanari | F02D 41/042 73/114.38 |
| 2009/0007647 | A1 * | 1/2009 | Kraemer | F02D 41/222 73/114.43 |
| 2015/0075251 | A1 * | 3/2015 | Jentz | F02M 25/0809 73/1.63 |

FOREIGN PATENT DOCUMENTS

| | | | | |
|---|---|---|---|---|
| DE | 19547647 A1 * | 6/1997 | ........... | F02D 41/222 |
| JP | 2003222045 A * | 8/2003 | ............ | F02D 41/22 |
| JP | 2006-320178 A | 11/2006 | | |

(Continued)

*Primary Examiner* — Nguyen Ha
(74) *Attorney, Agent, or Firm* — Mintz Levin Cohn Ferris Glovsky and Popeo, P.C.; Peter F. Corless

(57) ABSTRACT

A system and method are provided for compensating an offset of a pressure sensor. The system includes a pressure sensor that is configured to detect pressure and a power management module that is configured to automatically supply power to a controller connected to the power management module or terminate the supply of power after a preset time to thereby turn the controller on or off. The system further includes the controller connected to the power management module and configured to determine the offset of the pressure sensor based on a pressure value which is detected by the pressure sensor when the power is supplied from the power management module. The system also includes a memory configured to store the determined offset.

9 Claims, 3 Drawing Sheets

(56) References Cited

FOREIGN PATENT DOCUMENTS

| JP | 2009-002875 A | 1/2009 |
|----|---------------|--------|
| KR | 10-2002-0033768 A | 5/2002 |
| KR | 2006-0012314 A | 2/2006 |
| KR | 10-0863545 B1 | 10/2008 |
| KR | 2008-0107179 A | 12/2008 |

\* cited by examiner

SYSTEM AND METHOD FOR COMPENSATING OFFSET OF PRESSURE SENSOR

CROSS-REFERENCE TO RELATED APPLICATION(S)

Pursuant to 35 U.S.C. §119(a), this application claims priority to Korean Patent Application No. 10-2014-0099798, field on Aug. 4, 2014, the disclosure of which is incorporated herein in its entirety by reference.

TECHNICAL FIELD

The present disclosure relates to a system and a method for compensating an offset of a pressure sensor, and more particularly, to a system and a method for compensating an offset of a pressure sensor by compensating the offset of the pressure sensor using a wake-up mode.

BACKGROUND

A variety of sensors are used for a vehicle to enhance vehicle safety by controlling internal devices of the vehicle or monitoring states of the devices. Practically, however, sensors often suffer from degradation. For example, a pressure sensor outputs a value with an offset due to degradation of the sensor. This in turn alters the operation of devices within the vehicle whose control is based on the output value of the degraded sensor. Further, safety may be reduced while driving due to the offset value compared to the initial safety performance before the sensor is degraded.

Particularly, since the environment that a vehicle is used in may be severe (e.g., extreme weather, heat, cold, humidity, aridity, or the like), the degradation of the sensor inevitably increases and therefore, the lifespan of the sensor decreases. When a substantially low pressure sensor (e.g., about 3 bar or less) is used, since the substantially low pressure sensor is significantly affected by internal degradation, manufacturing reliability may be difficult. For example, when a diaphragm type pressure sensor is used, the above-mentioned problems are enhanced due to characteristics of fluid within the sensor when used in a severe environment. Since the diaphragm type pressure sensor guarantees initial precision, but is useful in a limited temperature range, such a sensor may not be suitable for all vehicle types. To increase a useful temperature range for the sensor, the pressure sensor must be able to perform with an increased error rate. The increase in the error rate of the sensor may decrease accuracy in controlling a system within the vehicle and as a result, thus causing degradation in the performance of the corresponding systems.

SUMMARY

The present disclosure provides a system and a method for compensating an offset of a pressure sensor including determining the offset of the pressure sensor and storing the determined offset by automatically turning on a controller after a vehicle system is turned off and a set time lapses during which an internal pressure of the vehicle system equilibrates with atmospheric pressure to detect the atmospheric pressure and a pressure value using the pressure sensor. The present disclosure also provides a system and a method for compensating an offset of a pressure sensor configured to sense a system pressure after compensating the pressure sensor offset by loading the offset of the pressure sensor, which is stored in a memory when the system is turned on.

According to an exemplary embodiment of the present disclosure, a system for compensating an offset of a pressure sensor may include: a pressure sensor configured to detect a pressure of a target system; a power management module connected to a controller and configured to automatically supply power to the controller connected to the power management module or terminate the supply of power to the controller after a preset time to turn the controller on or off; the controller and configured to determine the offset of the pressure sensor based on a pressure value which is detected by the pressure sensor when the power is supplied from the power management module; and a memory configured to store the determined offset. The pressure sensor may be a relative pressure-type pressure sensor or a gauge pressure sensor.

The system may further include an atmospheric pressure sensor executed by the controller to detect atmospheric pressure, wherein the pressure sensor may be an absolute pressure-type pressure sensor. The controller may be configured to determine the offset based on the detected absolute pressure value of the system and the detected atmospheric pressure. The memory may be a non-volatile memory. The system may also include a case configured to contain the atmospheric pressure sensor, the controller, the memory, and the power management module.

The atmospheric pressure sensor may be directly soldered on a printed circuit board within the case. The preset time may be a time during which the pressure of the system becomes about the same level as the atmospheric pressure or a time after the controller determines the offset. The pressure sensor, the power management module, and the controller may be disposed within a vehicle, and when the vehicle is turned on, the controller may be configured to load the offset stored in the memory so as to compensate the output value of the pressure sensor based on the loaded offset.

According to another exemplary embodiment of the present disclosure, a method for compensating an offset of a pressure sensor may include: turning off or turning on a system; determining whether a wake-up time has elapsed; turning the system on when the wake-up time is reached; detecting pressure of the system and atmospheric pressure; determining the offset of the pressure sensor configured to detect the pressure of the system based on the detected absolute pressure of the system and the detected atmospheric pressure; storing the determined offset; and interrupting the turning off of the control system. The wake-up time may be a time during which the pressure of the system equilibrates with the atmospheric pressure. The method may further include, interrupting the turning on of the system in response to an input, after again interrupting the turning on of the control system loading the stored offset; compensating an output value of the pressure sensor based on the loaded offset; and controlling the system based on the compensated output value.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
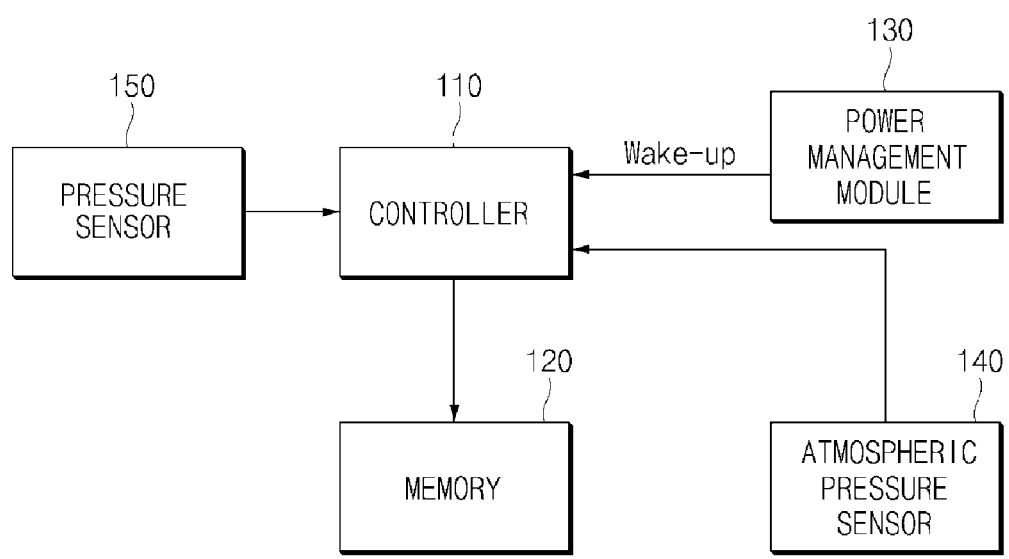
FIG. 1 is an exemplary diagram illustrating a system for compensating an offset of a pressure sensor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the drawings, the exemplary embodiments of the present disclosure are not limited to specific forms, but are exaggerated for clarity. In the present specification, specific terms have been used, but are just used for the purpose of describing the present disclosure and are not used for qualifying the meaning or limiting the scope of the present disclosure, which is disclosed in the appended claims.

The present disclosure is applied to a system of a vehicle in which after the system of the vehicle is turned off while the vehicle stops and stalls, a pressure monitored to control the system gradually becomes equal to atmospheric pressure over time (i.e., equilibrates). For example, the system may be for fuel gas supply. When the system is a fuel gas supply system, to secure system safety (e.g., to disable forcible fuel discharge by a gas discharge regulation safety system), the fuel gas may not be arbitrarily discharged. For example, it would not be allowed to discharge fuel gas to match a system pressure to the atmospheric pressure for determining an offset of a pressure sensor by discharging the gas when the vehicle is started or immediately after turning off the vehicle.

As a result, once the fuel gas supplying system is turned off, since an internal pressure of the corresponding system gradually equilibrates with the atmospheric pressure, it is generally not possible to determine an offset of the pressure sensor immediately after the vehicle is turned off. Conventionally, when waiting until the pressure of the system becomes substantially equal to the atmospheric pressure without turning off the fuel supply system or the vehicle for determining an offset of a pressure sensor, marketability of the vehicle may be reduced due to the degraded sensor.

According to exemplary embodiments of the present disclosure, the offset of the pressure sensor may be determined (detected) by automatically turning on (waking-up) a controller connected to a power management module only after a predetermined time lapses once the system is turned off and the determined (detected) offset may be stored in a memory, to compensate an output value of the pressure sensor when the system is subsequently turned on.

FIG. 1 is an exemplary diagram illustrating a system for compensating an offset of a pressure sensor according to an exemplary embodiment of the present disclosure. Referring to FIG. 1, the system for compensating the offset of the pressure sensor may include a pressure sensor 150 configured to operate a system, a controller (or microcomputer) 110, a memory 120, a power management module 130, and an atmospheric pressure sensor 140. The system being operated by the pressure sensor 150 may be a fuel supply system or other vehicular system.

First, the pressure sensor 150 for controlling the system may be configured to detect a pressure value for a corresponding system to operate the corresponding system. In addition, the pressure sensor 150 may be configured to detect the pressure value of the corresponding system by operating the controller 110 and transmitting the detected pressure value to the controller 110. The power management module 130 may be connected to the controller 110 and may be configured to supply power to the connected controller 110 based on the preset time or terminate the supply of power. Specifically, the power management module 130 may be configured to preset a time at which a power supply is required, and turn the controller 110 on by automatically supplying power to the connected controller 110 when the preset time has elapsed. In addition, the power management module 130 may be configured to preset a time at which the power supply may be terminated, and turn off the connected controller 110 by automatically terminating the power supply to the connected controller 110 when the corresponding time has elapsed. The preset time may be a time required for the pressure of the system to equilibrate with the atmospheric pressure or a time at which the controller 110 determines the offset and stores the determined offset in the memory 120.

The controller 110 may be connected to the power management module 130, and may be configured to be turned on when the preset time has elapsed as the power is supplied from the power management module 130, and determine (detect) the offset of the pressure sensor 150 for controlling the system based on the pressure of the system detected from the pressure sensor 150 and an atmospheric pressure detected from the atmospheric pressure sensor 140 to be described below. In other words, when the pressure of the system gradually decreases over time and equilibrates with the atmospheric pressure, the power management module 130 may be configured to supply power to the controller 110 and the controller 110 may be turned on by the supplied power to determine the offset of the pressure sensor 150 based on the pressure of the system and the atmospheric pressure. The offset may be a value obtained by subtracting the atmospheric pressure from the pressure of the system detected by the pressure sensor 150. In addition, after determining the offset, the controller 110 may be turned off according to an operation of the power management module 130.

The atmospheric pressure sensor 140 may be configured to operate under control of the controller 110, detect the atmospheric pressure, and transmit the detected atmospheric pressure to the controller 110. When the pressure sensor 150 is a relative pressure-type pressure sensor or a gauge pressure sensor, and when the atmospheric pressure is expected to be about zero, the system for compensating the offset of the pressure sensor according an the exemplary embodiment of the present disclosure which may not include the atmospheric pressure sensor 140. However, when the pressure sensor 150 is an absolute pressure-type pressure sensor, since the offset may be determined based on the atmospheric pressure, the system for compensating the offset of the pressure sensor must include an atmospheric pressure sensor 140.

The memory 120 may be configured to store the offset determined by the controller 110. The memory 120 may include a non-volatile memory to store the offset when the vehicle is turned off (or when power in the vehicle is turned off) thereby the corresponding system (e.g., the fuel gas supply system) is also turned off. In addition, the controller 110, the memory 120, and the power management module 130 may be configured and operated by a specific controller to be included within the same case. In particular, the atmospheric pressure sensor 140 may also be included within the same case. The atmospheric pressure sensor 140 disposed within the same case may be directly soldered on a printed circuit board (PCB) within the case. As a result, since the atmospheric pressure sensor 140 may be less affected by an external environment, the atmospheric pressure sensor 140 may maintain greater reliability even when a pressure sensor of substantially low cost is used.

In addition, when the vehicle starts or the system is turned on after the offset is stored in the memory 120, the controller 110 may be configured to load the offset stored in the memory 120 to compensate the output value of the pressure sensor 150 for controlling the system based on the loaded offset. As a result, since the controller 110, which may be configured to be automatically turned on by the power management module 130, after a sufficient time during which the pressure of the system equilibrates with the atmospheric pressure, may be configured to determine the offset of the pressure sensor 150, store the offset in the memory 120, and then compensate the output value of the pressure sensor 150 using the stored offset, the system for compensating the offset of the pressure sensor does not have to forcibly turn on the corresponding system during the time in which the pressure of the system equilibrates with the atmospheric pressure.

When a controlled system is a fuel supply system, (i.e. when the system that uses the system for compensating the offset of the pressure sensor is a fuel gas supplying system), the offset may be automatically determined without discharging the gas by opening an exhaust valve, or the like, to discard hydrogen through the exhaust system and match an internal pressure to the atmospheric pressure. In addition, to compensate the offset of the pressure sensor, due to the opening of the exhaust valve to match an anode pressure to the atmospheric pressure, oxygen may be introduced to the anode or an internal fuel may be discharged to the exterior by the above-mentioned conventional process, thus solving a potential problem involving exhaust gas-related regulations.

Figure 2:
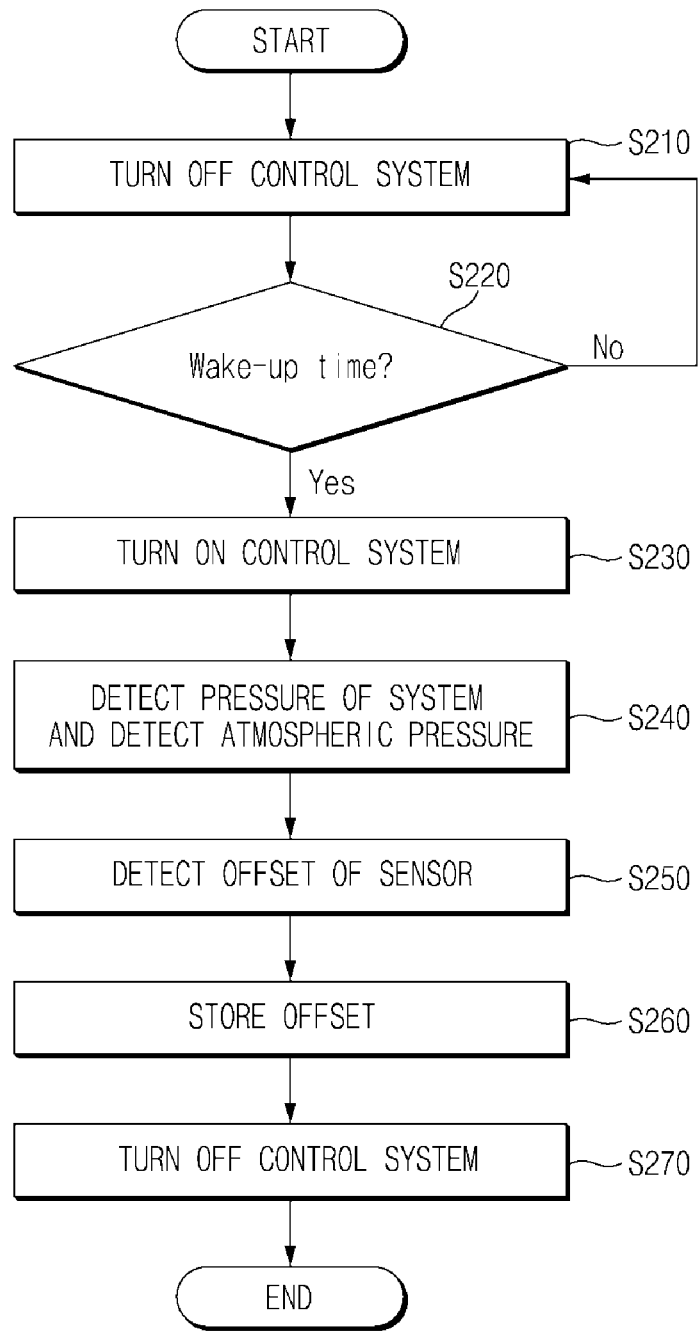
FIG. 2 is an exemplary diagram illustrating a method for compensating an offset of a pressure sensor according to another exemplary embodiment of the present disclosure.

FIG. 2 is an exemplary diagram illustrating a method for compensating an offset of a pressure sensor according to another exemplary embodiment of the present disclosure. Referring to FIG. 2, in the method for compensating the offset of the pressure sensor, after a system is turned off, the offset of the pressure sensor may be detected. First, due to the turning off of the vehicle, or the like, the vehicle may be stalled or a control system may be turned off (S210). The power management module 130 may be configured to determine whether or not a preset time (wake-up time), which may be a specific delay time for turning the control system on, has elapsed (S220). Accordingly, when the preset time has not elapsed, the process may again return to S210, and when the preset time has elapsed, the process may proceed to S230. The preset time may be an amount of time necessary for the pressure of the system to equilibrate with the atmospheric pressure. The power management module may operate the control system to turn on (S230).

Further, the control system may be configured to detect a pressure of a system within the vehicle using the pressure sensor for controlling the system and detect the atmospheric pressure using the atmospheric pressure sensor (S240). The control system may also be configured to detect the offset of the pressure sensor for controlling the system based on the pressure of the system and the atmospheric pressure which may be detected in S240 (S250). The offset detected in S250 may be stored in the memory (S260), and the power management module may operate the control system to be turned off (S270).

Figure 3:
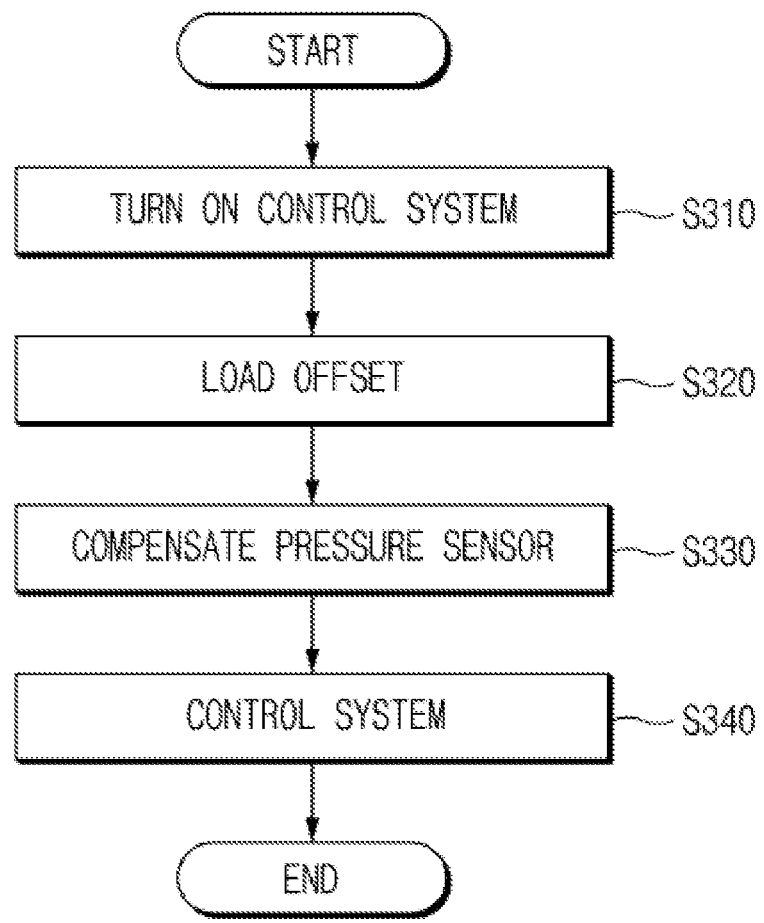
FIG. 3 is an exemplary diagram illustrating a method for compensating an offset of a pressure sensor according to still another exemplary embodiment of the present disclosure.

FIG. 3 is an exemplary diagram illustrating a method for compensating an offset of a pressure sensor according to still another exemplary embodiment of the present disclosure. Referring to FIG. 3, the method for compensating the offset of the pressure sensor may include: when the system is turned on, an output value of the pressure sensor is compensated by the controller 100, based on the offset which may be detected and stored. The vehicle may be started or the control system may be turned on (S310). The control system may be configured to load the offset which may be stored in the memory in S260 described above (S320). Additionally, the control system may be configured to compensate an output value of the pressure sensor based on the loaded offset (S330) and operate the system based on the compensated output value of the pressure sensor (S340).

Consequently, in the method for compensating the offset of the pressure sensor according to the exemplary embodiment of the present disclosure, since the offset of the pressure sensor may be automatically determined based on the detected value of the pressure sensor and the atmospheric pressure after the time during which the pressure of the system equilibrates to the atmospheric pressure lapses, and the offset is stored, the corresponding system may not have to be forcibly turned on during a time in which the pressure of the system equilibrates with the atmospheric pressure, therefore when the system is a fuel gas supplying system, hydrogen may not be discarded from the system and oxygen may not be introduced into the anode through the exhaust system.

As described above, the system and the method for compensating the offset of the pressure sensor according to the exemplary embodiments of the present disclosure may determine the offset of the pressure sensor and store the determined offset by automatically turning on the controller only after a preset time after the vehicle system is turned off. Also, the preset time during which the internal pressure of the vehicle system and the atmospheric pressure equilibrate has elapsed, and the system may thus detect the atmospheric pressure and the value of the offset for the pressure sensor. In addition, the system may be configured to sense the system pressure after compensating the pressure sensor offset by loading the offset stored in the memory when the system is turned on.

Hereinabove, although the present disclosure has been described with reference to the exemplary embodiments thereof, those skilled in the art will appreciate that various modifications, additions and substitutions of the present disclosure are possible without departing from the scope and spirit of the present disclosure. Accordingly, the scope of the present disclosure is not construed as being limited to the described exemplary embodiments but is defined by the appended claims as well as equivalents thereto. Considering the contents as described above, if modifications and alterations of the present disclosure are included in the following claims and a scope equivalent thereto, it is considered that the present disclosure includes these modifications and alterations thereof.

What is claimed is:

1. A system for compensating an offset of a pressure sensor, the system comprising:
    the pressure sensor configured to detect a pressure of a target system;
    a power management module configured to automatically supply power to a microcomputer and terminate supply of power to the microcomputer according to a preset time to turn the microcomputer on or off,
    wherein the microcomputer is configured to determine the offset of the pressure sensor based on a pressure value of the target system which is detected from the pressure sensor when the power is supplied from the power management module; and
    a memory configured to store the determined offset,
    wherein the microcomputer is configured to compensate, based on the determined offset, an output value from the pressure sensor.

2. The system according to claim 1, wherein the preset time is one from the group consisting of a time during which the pressure of the system equilibrates with the atmospheric pressure and a time necessary for the microcomputer to determine the offset.

3. The system according to claim 1, wherein the pressure sensor includes a relative pressure-type pressure sensor or a gauge pressure sensor.

4. The system according to claim 1, further comprising:
    an atmospheric pressure sensor configured to detect atmospheric pressure according to a control of the microcomputer,
    wherein the pressure sensor is an absolute pressure-type pressure sensor, and
    wherein the microcomputer is configured to determine the offset based on the detected absolute pressure value of the system and the detected atmospheric pressure.

5. The system according to claim 1, wherein the memory is a non-volatile memory.

6. The system according to claim 4, wherein the atmospheric pressure sensor is included in a case including the microcomputer, the memory, and the power management module.

7. The system according to claim 6, wherein the atmospheric pressure sensor is directly soldered on a printed circuit board within the case.

8. The system according to claim 1, wherein the pressure sensor, the power management module, and the microcomputer are disposed within a vehicle, and
    the microcomputer is configured to load the offset stored in the memory and compensate the output value of the pressure sensor based on the loaded offset when the vehicle is turned on.

9. The system according to claim 4, wherein the pressure sensor, the power management module, and the microcomputer are disposed within a vehicle, and
    the microcomputer is configured to load the offset stored in the memory and compensate the output value of the pressure sensor based on the loaded offset when the vehicle is turned on.

* * * * *